United States Patent [19]

Ott et al.

[11] Patent Number: 5,139,306
[45] Date of Patent: Aug. 18, 1992

[54] MOUNTING SYSTEM FOR SECURING A PIECE OF TRIM TO AN AUTOMOBILE FENDER

[75] Inventors: Siegfried Ott, Waginger Str. 46, 8221 Traunstein-Hufschlag, Fed. Rep. of Germany; Gerda Holey, Haupstr. 26 B, 8441 Feldkirchen, Fed. Rep. of Germany

[73] Assignees: Siegfried Oh; Gerda Holey, both of Geisel, Fed. Rep. of Germany

[21] Appl. No.: 541,014

[22] Filed: Jun. 20, 1990

[30] Foreign Application Priority Data

Mar. 1, 1990 [DE] Fed. Rep. of Germany ... 9000526[U]

[51] Int. Cl.⁵ .................................................. B62D 25/00
[52] U.S. Cl. .................................... 296/198; 24/290; 24/295; 280/770
[58] Field of Search .............. 411/400, 401, 112, 222, 411/378; 24/289, 290, 291, 295, 458, 573.2; 403/405.1, 406.1; 293/128; 280/848, 850, 851, 154, 770; 296/198

[56] References Cited

U.S. PATENT DOCUMENTS

| | | | |
|---|---|---|---|
| 2,077,818 | 4/1937 | Zaiger | 280/851 |
| 2,217,389 | 10/1940 | Steger | 411/401 X |
| 2,308,166 | 1/1943 | Fulton | 403/406.1 X |
| 2,717,562 | 9/1955 | Ewing | 411/400 X |
| 3,295,807 | 1/1967 | Von Volki | 411/400 X |
| 3,343,853 | 9/1967 | Stute | 403/405.1 X |
| 4,248,285 | 2/1981 | Flaig | 411/222 X |
| 4,514,003 | 4/1985 | Guy | 24/295 X |
| 4,629,232 | 12/1986 | Zimlich et al. | 293/128 |
| 4,715,648 | 12/1987 | Hensel | 293/128 X |
| 5,022,692 | 6/1991 | Horanski et al. | 293/128 |

Primary Examiner—James R. Brittain
Attorney, Agent, or Firm—Sixbey, Friedman, Leedom & Ferguson

[57] ABSTRACT

An improved mounting system for securely attaching a piece of arcuate trim around a vehicle fender is disclosed herein. Such vehicle fenders have an inner edge that terminates in an upwardly directed flange, while the vehicle trim has a mounting flange nestable over the fender flange which further includes a plurality of elongated slots. The mounting system comprises a U-shaped strip of resiliently deformable metal whose opposing sides define a U-shaped recess for receiving the upwardly directed flange of the fender, as well as a fastener assembly for fastening the mounting flange of the trim to the clamping member that includes a threaded stud, one end of which is connected to a first side of the U-shaped strip of metal forming the clamping member. When the free end of the stud is inserted through one of the slots in the trim, and a nut is threadedly engaged to the stud, the mounting flange of the trim is secured to the clamping member. As the nut is tightened, one of the sides of the U-shaped strip of resiliently deformable metal is deformed toward the fender flange captured within the metal strip, which is turn increases the clamping force between the fender flange and the U-shaped strip that forms the clamping member. The improved system secures metal trim to vehicle fenders without the need for drilling holes in the fenders, which could promote corrosion.

1 Claim, 3 Drawing Sheets

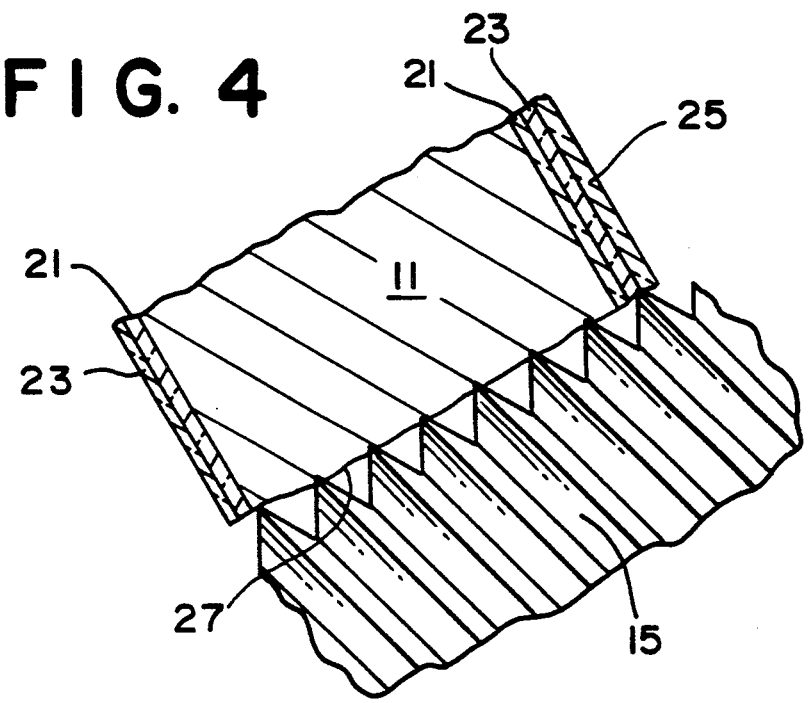
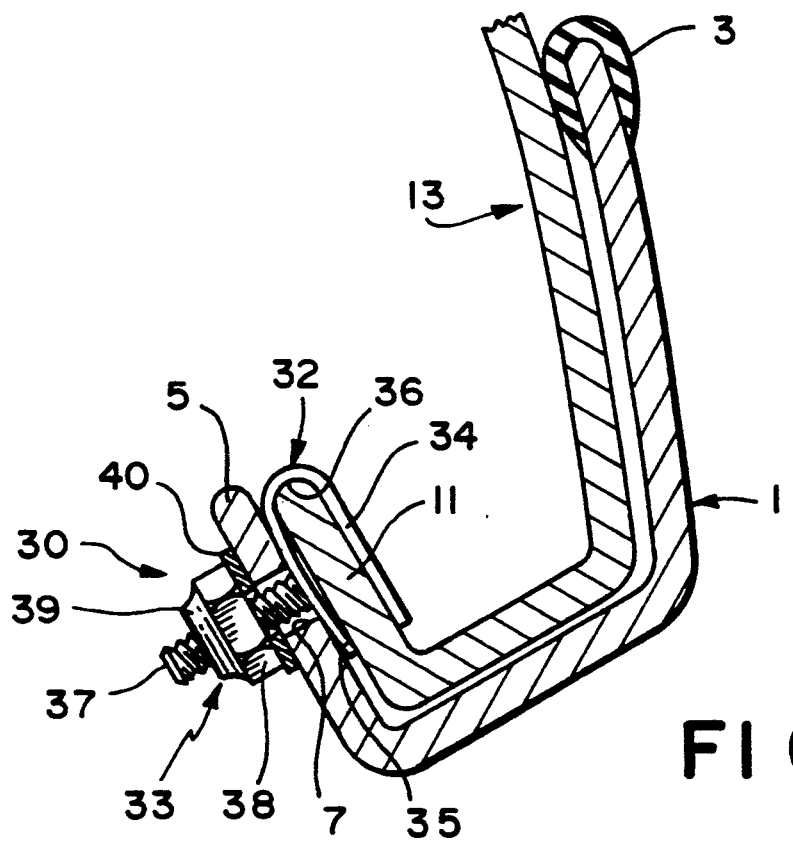

MOUNTING SYSTEM FOR SECURING A PIECE OF TRIM TO AN AUTOMOBILE FENDER

BACKGROUND OF THE INVENTION

This invention concerns an improved mounting system, and is specifically concerned with a system for securing a piece of arcuate trim around a vehicle fender without the need for drilling holes in the fender.

Mounting assemblies for securing metallic trim to fenders and other portions of motor vehicles are known in the prior art. One of the most common prior art mounting assemblies is comprised of a set of sheet metal screws and washers. In operation, the metallic vehicle trim is placed in proper position around the inner flange of the vehicle fender or other vehicle portion where the trim is to be mounted. Since such metallic trims already have holes or elongated slots previously cut or drilled into them, the installer of the trim typically marks where these holes or slots fall on the flange of the fender, and then drills holes at these locations. In the final steps of installation, the metallic trim is positioned back over the flange of the fender or other vehicle portion so that the drilled holes are in registry with the slots. The sheet metal screws and washers are then installed, which tightly secures the trim into position around its respective fender. The provision of slots in lieu of holes in the metallic trim not only makes installation easier but further allows the metallic trim to expand and contract easier along with the metal that forms the fender or other vehicle portion in response to temperature changes.

While the aforementioned prior art system has proven itself to be a reliable method for securing metallic automotive trim around the fenders of such vehicles, it is unfortunately accompanied by a number of drawbacks. For example, the drilling of holes through the fender flanges breaks the integrity of the paint, primer and undercoating present on these surfaces, and thereby exposes bare metal surfaces which are vulnerable to rust and corrosion. Moreover, the installation procedure requires the awkward positioning of an electric drill at an oblique angle in the wheel well to drill the required holes in the inner portion of the vehicle fender, which in turn makes the installation process more complex, time consuming and expensive than desirable.

Clearly, there is a need for an improved mounting system for securing a piece of metallic trim to the fender of an automobile which does not require the drilling of holes in the sheet metal forming the fender, but yet is strong, secure and reliable. Ideally, such a mounting system should obviate the need for an electric drill or any other kind of special tool, and should further simplify and expedite the trim mounting operation. Finally, as there are a variety of different fenders and different trims for fitting these fenders, it would be desirable if the same system were adaptable for use in all trim mounting situations, despite differences in the size and shape of both the trim and the fenders which it covers.

SUMMARY OF THE INVENTION

The invention is an improved mounting system for securely attaching a piece of trim around a vehicle fender that overcomes all of the shortcomings associated with the prior art. The mounting system of the invention generally comprises a clamping member for receiving the upwardly directed flange of the fender, and a fastener assembly for fastening the mounting flange of the trim to the clamping member.

The clamping member is preferably formed from a U-shaped strip of resiliently deformable metal that has opposing sides that define a U-shaped recess for receiving the upwardly directed flange of the fender. The width of the sides of the U-shaped strip of metal is preferably less than the length of the slots already present in the mounting flange of the automotive trim.

The fastener assembly includes a threaded stud, one end of which is connected by way of spot welding to a first side of the U-shaped strip of metal that forms the clamping member, the other end of which is freely insertable through one of the slots in the mounting flange of the trim. The fastener assembly further includes a nut threadedly engageable to the stud for both securing the mounting flange of the trim to the clamping member, and for deformably flexing the first side of the U-shaped strip of metal into a tighter clamping engagement against the fender flange. The nut accomplishes this function by pulling opposing portions of the U-shaped strip against the edges of the elongated slot in the mounting flange of the trim, and against the rounded contour of the trim itself, so that the outer edge of the first side of the U-shaped strip of metal more tightly engages its respective side of the fender flange. Such deformable flexing also has the effect of pulling the second side of the U-shaped strip of resiliently formed deformable metal against the other side of the fender flange. Hence, the nut, in addition to securing the mounting flange of the trim to the clamping member, also advantageously tightens the grasp of the clamping member around the upwardly directed flange of the fender itself.

One such clamping member and fastener assembly should be provided for each one of the seven or so slots already present and the automotive trim.

The provision of such a U-shaped clamping member in combination with the previously described fastener assembly provides an improved mounting system which is capable of securely fastening a section of automotive trim around the fender of a vehicle without the need for drilling holes which could promote corrosion in the metal forming the trim. The new system further provides a faster and more convenient way in which to secure such trim around a vehicle fender.

BRIEF DESCRIPTION OF THE SEVERAL FIGURES

FIG. 4 is an enlarged view of the circle area in FIG. 2 illustrating how the drill holes necessary for the use of the prior art mounting system break the integrity of the primer and undercoating used to cover the fender flanges in a typical vehicle;

FIG. 6 is a cross-sectional side view of how the mounting system of the invention secures a piece of trim to a flange of a fender.

DETAILED DESCRIPTION OF THE PREFERRED EMBODIMENT

Figure 1:
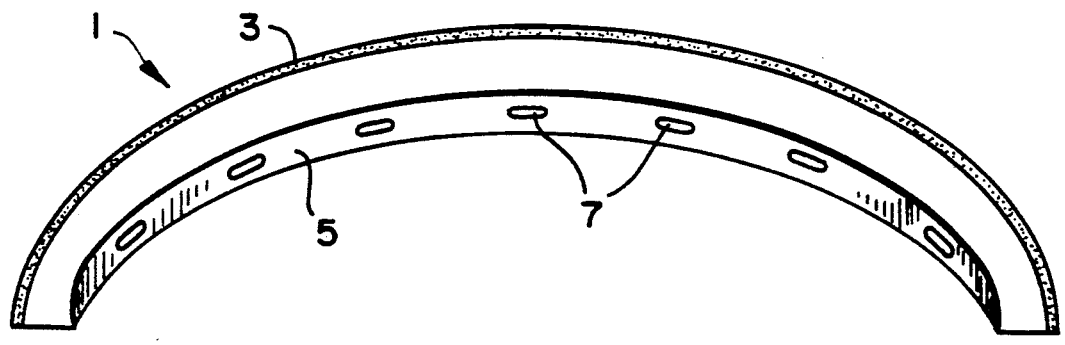
FIG. 1 is a side view of the type of automotive trim that the improved mounting system of the invention can install onto a vehicle.
Figure 2:
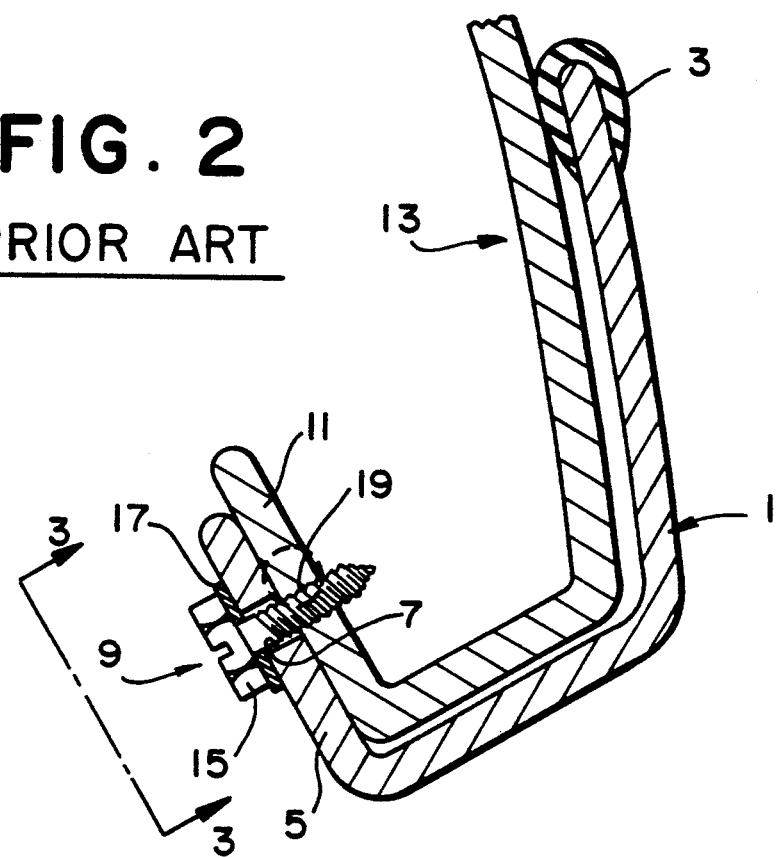
FIG. 2 is a cross-sectional side view of the trim illustrated in FIG. 1 installed onto the flange of a fender of an automobile by means of a prior art mounting system.

With reference now to FIGS. 1 and 2, wherein like numerals designate like components throughout all of the several figures, the principle purpose of the clamp fastener 30 of the invention is to securely attach a trim assembly 1 to the inner edge of a vehicle fender. Such trim assemblies 1 are generally formed from a stamped section of sheet metal, which may be copper or brass which has been chrome plated. Such trim assemblies 1 typically include a rubber molding 3 over their upper edges, and a mounting flange 5 along their lower edges. As is evident in FIG. 2, the mounting flange 5 is nestable with the inner flange of the fender of an automobile or other vehicle. To facilitate the mounting process, a series of holes which are preferably slots 7 are provided in the mounting flange 5 of the trim assembly.

Figure 3:
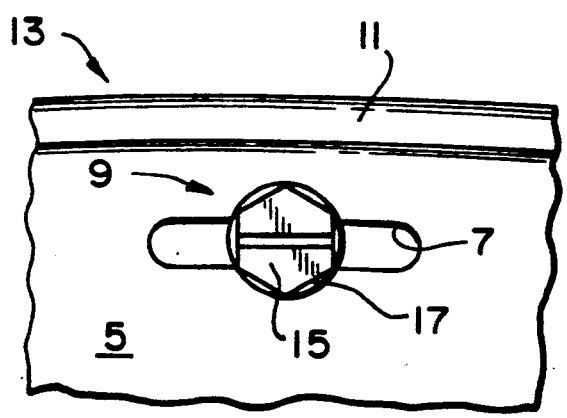
FIG. 3 is a plan view of the prior art mounting system illustrated in FIG. 2 along the line 3—3.

FIGS. 2 and 3 illustrate how a prior art mounting assembly 9 secures a trim assembly 1 to the inner flange 11 of the fender 13 of an automobile or other vehicle. Such prior art mounting assemblies consisted of simply of a self-tapping sheet metal screw 15 and a washer 17. The sheet metal screw 15 was screwed into a hole 19 which was drilled into the inner flange 11 of the vehicle fender prior to mounting.

FIG. 4 illustrates the manner in which such prior art mounting assemblies 9 resulted in the exposure of bare metal surfaces in the fender 13. Specifically, upon their manufacture, all surfaces of such fenders 13 are covered first with a primer 21, and then by a coating of paint 23. Additionally, on the inner surfaces of the fender 13, a layer of undercoating 25 is applied to protect the metal that forms the fender 13 from the corrosive salts and other substances that the vehicle wheel throws up into the wheel well of the vehicle. Unfortunately, the drilling of the hole 19 results in the exposure of a bare metal surface 27 within the inner flange 11 of the fender 13, which, is prone to rust or other corrosion. Over a period of time, the resulting rust or corrosion could have the effect of corrosively locking the sheet metal screw 15 in place in the drilled hole 19. As the corrosion or rust deepened, and if the screw 15 were subjected to any kind of mechanical shock, the rusted metal around the screw threads could break off, thereby jeopardizing the mounting of the trim assembly 1 to the fender 13. Over even longer periods of time, the integrity of the fender 13 itself might be jeopardized by the rust started by the drilling of the holes 19.

Figures 5A, 5B:
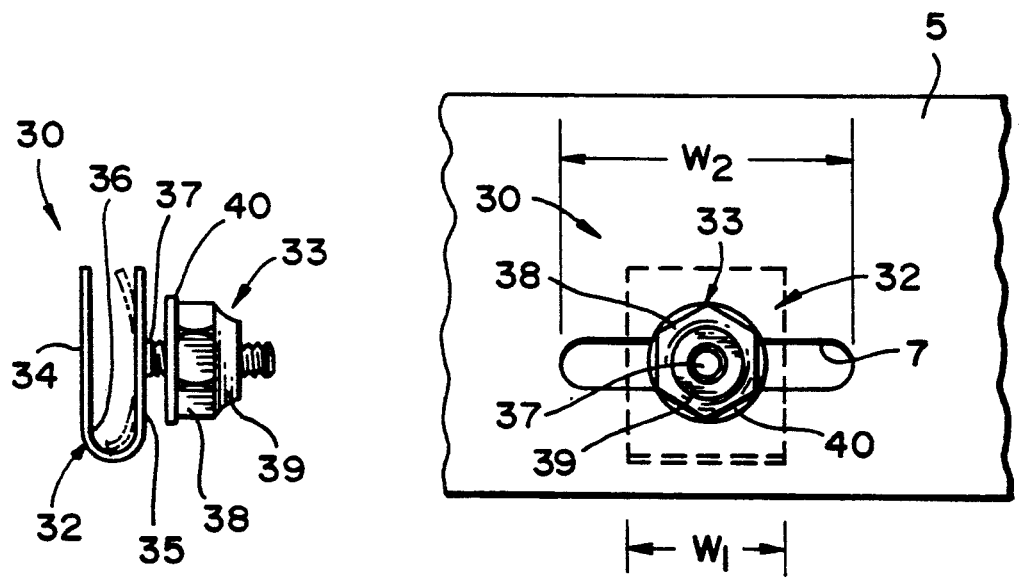
FIGS. 5A and 5B are a side and a plan view, respectively, of the, components which form the mounting system of the invention.

With reference now to FIGS. 5A, 5B and 6, the clamp fastener 30 of the invention overcomes all the aforementioned shortcomings associated with the prior art mounting assembly 9. Clamp fastener 30 is formed from the combination of a U-shaped clamping member 32 and a fastener assembly 33. The U-shaped clamping member 32 if preferably formed from a strip of resilient, yieldable, non-corrosive metal such as stainless steel and includes an inner side 34, an outer side 35, and a U-shaped recess 36 that is complimentary in shape to the edge of the inner flange 11 of the fender 13. The fastener assembly 33 includes a threaded stud 37, one end of which is securely welded to the outer side 35 of the U-shaped clamping member 32. The fastener assembly 33 further includes a lock nut 38 that is threadedly engageable over the free end of the threaded stud 37. Lock nut 38 includes a locking portion 39 formed from a deformable plastic material which keeps the nut 38 securely in place on the threaded stud 37 despite vibration caused by the movement of the vehicle. A flat washer 40 is provided around the stud 37 and beneath the bottom surface of the lock nut 38 as shown.

To install the clamp fastener 30 that forms the mounting system of the invention, the installer first places the trim 3 in the desired position around the inner flange 11 of the fender, and, using a pencil or other tool marks where the threaded slots 7 overlie the flange 11. Next, the installer takes as many clamp fasteners 30 as there are slots 7 in the trim assembly 1, and slides the U-shaped clamping member 32 of each fastener 30 over the inner flange 11 of the fender 13 along the center line of each slot location in the position illustrated in FIG. 5B. For the proper functioning of the clamp fastener 30, it is important that the width w1 of the U-shaped clamping member 32 be completely subsumed within the width w2 of the location of the mounting slot 7 which will overlie it. For this purpose, the width w1 of the U-shaped clamping members 32 are deliberately made to be smaller than the width w2 of the slots present in the mounting flange 5 of the trim assembly 1. During this step, it is important to note that both the lock nut 38 and washer 40 have been removed from the clamp fastener 30 so that at the completion of this step, only the free end of the threaded stud 37 of each of the clamp fasteners 30 projects out from the inner flange 11 of the fender 13.

In the next step of the installation, the trim assembly 1 is place again into proper position around the inner flange 11 of the fender 13 so that the free end of the stud 37 of each of the clamp fasteners 30 projects through each of the slots 7 in the flange 5. The washer 40 and lock nut 38 of each of the clamp fasteners 30 is then disposed and engaged over the free end of the threaded stud 37 of each. In the last step of the installation, the lock nuts 38 of each of the clamp fasteners 38 are tightened into the position of FIG. 6 in order both to securely "sandwich" the mounting flange 5 of the trim assembly between outer side 35 of the U-shaped clamping member 32 and the washer 40 of the fastener assembly 33, as well as to yieldable deform the outer side 35 of the U-shaped clamping member 32 into the position illustrated in FIG. 6 (and illustrated in phantom in FIG. 5A). The deformation of the outer side 35 of the U-shaped clamping member 32 caused by the tightening of the lock nut 38 advantageously increases the clamping engagement between the inner flange 11 of the fender 13, and the U-shaped clamping member 32 by forcefully pressing the edge of the outer side 35 into tighter engagement against the outer face of the flange 11, and by further pulling the inner side 34 of the U-shaped clamping member 32 into tighter engagement against the inner side of the inner flange 11.

Because there is no need to drill holes in the fender 13 in order to install a trim assembly 1 with the clamp fastener of the invention, the invention avoid the creation of bare metal surfaces which could cause corrosion in the fender. Additionally, the clamp fastener 30 of the invention obviates the need for an electric drill, and otherwise simplifies and expedites the process of installing a trim assembly 1 to the fender 13 of an automobile.

I claim:

1. An improved mounting system for securely attaching a piece of arcuate trim around a vehicle fender having an inner edge that terminates in an upwardly directed flange, comprising;

a piece of trim having a mounting flange positionable over said fender flange, wherein said mounting flange includes a plurality of elongated slots, each of which is parallel to the arcuate profile of the trim;

a clamping member formed from a U-shaped strip of resiliently deformable metal whose opposing sides define a U-shaped recess for receiving the upwardly directed flange of the fender, the width of the sides being less than the length of the slots in the trim mounting flange, and a fastener assembly for fastening the mounting flange of the trim to the clamping member, including a threaded stud, one end of which is connected to a first side of the U-shaped strip of metal forming the clamping member, the other end of which is freely insertable through one of said slots in the trim mounting flange, and a nut threadedly engageable to the stud for both securing the mounting flange of the trim to the clamping member, and for deformably flexing the first side of the U-shaped strip of metal by pulling opposing portions of said strip against the edges of said elongated slot in said mounting flange of said trim so that an edge portion of said first side more tightly engages one side of said fender flange, and so that the second side of said strip more tightly engages the other side of said fender flange.

* * * * *